US012328547B2

(12) United States Patent
Vuine

(10) Patent No.: US 12,328,547 B2
(45) Date of Patent: Jun. 10, 2025

(54) LOUDSPEAKER

(71) Applicant: PSS BELGIUM NV, Dendermonde (BE)

(72) Inventor: Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 0 days.

(21) Appl. No.: 18/847,090

(22) PCT Filed: Mar. 28, 2023

(86) PCT No.: PCT/EP2023/058051
§ 371 (c)(1),
(2) Date: Sep. 13, 2024

(87) PCT Pub. No.: WO2023/194163
PCT Pub. Date: Oct. 12, 2023

(65) Prior Publication Data

US 2025/0113148 A1 Apr. 3, 2025

(30) Foreign Application Priority Data

Apr. 4, 2022 (GB) ..................................... 2204878

(51) Int. Cl.
*H04R 11/02* (2006.01)

(52) U.S. Cl.
CPC .......... *H04R 11/02* (2013.01); *H04R 2400/07* (2013.01); *H04R 2400/11* (2013.01); *H04R 2499/13* (2013.01)

(58) Field of Classification Search
CPC ................ H04R 11/02; H04R 2400/07; H04R 2400/11; H04R 2499/13
See application file for complete search history.

(56) References Cited

U.S. PATENT DOCUMENTS

2004/0156527 A1 8/2004 Stiles et al.
2011/0243370 A1 10/2011 Wang
(Continued)

FOREIGN PATENT DOCUMENTS

CN 102026072 A 4/2011
CN 204046801 U 12/2014
(Continued)

OTHER PUBLICATIONS

EPO; International Search Report and Written Opinion for corresponding PCT Patent Application No. PCT/EP2023/058051, mailed Sep. 6, 2023, 33 pages.

(Continued)

*Primary Examiner* — Sunita Joshi
(74) *Attorney, Agent, or Firm* — NK Patent Law

(57) ABSTRACT

There is provided a loudspeaker including a frame, a diaphragm suspended from the frame and a drive unit; wherein the drive unit has a stationary part secured to the frame and a translatable part secured to the diaphragm, the translatable part of the drive unit includes a magnet unit configured to produce a magnetic field in an air gap, the stationary part of the drive unit includes a voice coil configured to sit in the air gap when the diaphragm is at rest; and the loudspeaker is operable to energise the voice coil to cause the magnet unit to move along a movement axis relative to the voice coil, thereby moving the diaphragm along the movement axis to produce sound.

12 Claims, 16 Drawing Sheets

(56) References Cited

U.S. PATENT DOCUMENTS

| | | | | |
|---|---|---|---|---|
| 2012/0008813 | A1 | 1/2012 | Rosen | |
| 2015/0125025 | A1 | 5/2015 | Button | |
| 2016/0192076 | A1* | 6/2016 | Noertker | H04R 9/045 381/370 |
| 2016/0192078 | A1* | 6/2016 | Timothy | H04R 11/02 381/400 |
| 2017/0303044 | A1 | 10/2017 | Sterling | |

FOREIGN PATENT DOCUMENTS

| | | | |
|---|---|---|---|
| CN | 204498361 | U | 7/2015 |
| CN | 210629844 | U | 5/2020 |
| CN | 113906767 | A | 1/2022 |
| CN | 113950843 | A | 1/2022 |
| EP | 3859981 | A1 | 5/2020 |
| JP | H06315195 | A | 11/1994 |
| JP | 2009124348 | A | 6/2009 |
| JP | 2011030013 | A | 2/2011 |
| JP | 2018074471 | A | 5/2018 |
| JP | 2018074472 | A | 5/2018 |
| WO | 2016004580 | A1 | 1/2016 |
| WO | 2020234316 | A1 | 11/2020 |
| WO | 2020239766 | A1 | 12/2020 |

OTHER PUBLICATIONS

EPO; International Preliminary Report on Patentability for corresponding PCT Patent Application No. PCT/EP2023/058051, dated Apr. 9, 2024, 14 pages.

EPO; Second Written Opinion for corresponding PCT Patent Application No. PCT/EP2023/058051, mailed Feb. 2, 2024, 12 pages.

CNIPA; The First Office Action for corresponding Chinese Patent Application (Application No. 2023800325852, Issue Serial No. 2025030401969630), issued Mar. 4, 2025, 8 pages.

EPO; Extended European Search Report for corresponding European Patent Application No. 25153938.3, dated Mar. 10, 2025, 12 pages.

* cited by examiner

LOUDSPEAKER

CROSS-REFERENCE TO RELATED APPLICATIONS

This application is a U.S. National Stage Application of International Patent Application No. PCT/EP2023/058051, filed on Mar. 28, 2023, which claims priority to United Kingdom Patent Application No. GB2204878.9, filed on Apr. 4, 2022.

FIELD OF THE INVENTION

The present invention relates to a loudspeaker including a frame, a diaphragm and a drive unit. In some examples, this invention relates to subwoofers.

BACKGROUND

A typical conventional loudspeaker has a frame, a diaphragm and a drive unit for the reproduction of sound. In use, the drive unit causes the diaphragm, which acts as a piston, to move backwards and forwards to generate pressure waves, i.e. sound.

The drive unit typically includes a magnet unit attached to the frame and a voice coil attached to the diaphragm. By energising the voice coil, the magnet unit and the voice coil magnetically cooperate, i.e. magnetically interact, with each other to effect displacement of the combination of the voice coil and the diaphragm to thereby produce sound.

SUMMARY OF THE INVENTION

In contrast to the conventional loudspeaker outlined in the background section above, according to the present invention there is provided a loudspeaker with a drive unit including a translatable magnet unit and a stationary voice coil.

According to a first aspect of the invention, there is provided a loudspeaker including a frame, a diaphragm suspended from the frame and a drive unit. The drive unit has a stationary part secured to the frame and a translatable part secured to the diaphragm. The translatable part of the drive unit includes a magnet unit configured to produce a magnetic field in an air gap. The stationary part of the drive unit includes a voice coil configured to sit in the air gap when the diaphragm is at rest. The loudspeaker is operable to energise the voice coil to cause the magnet unit to move along a movement axis relative to the voice coil, thereby moving the diaphragm along the movement axis to produce sound.

The loudspeaker may provide an improved structure with fewer and/or simpler component parts, for example removing the need for flexible lead wires and ticking noise that can be associated with flexible lead wires. Moreover, the exemplary loudspeaker may be manufacturable on existing production lines with existing machines, jigs and fixtures.

The loudspeaker may include one or more suspension elements, preferably at least two suspension elements.

The one or more suspension elements may include a first suspension element, e.g. a surround, which attaches to the frame at a first landing surface on the frame. The first suspension element may attach directly or indirectly to the diaphragm. In particular, the first suspension element may be secured to an outer edge of the diaphragm.

The one or more suspension elements may include a second suspension element, e.g. a damper, which attaches to the frame at a second landing surface on the frame. The second suspension element may, for example, be secured to the translatable part of the drive unit or may be secured to the diaphragm at a location inwardly located with respect to the outer edge of the diaphragm.

The centre of gravity of the translatable part of the drive unit may have a position along the movement axis that is between the first landing surface and the second landing surface.

By locating the centre of gravity of the magnet unit between the first landing surface and the second landing surface, rocking may be inhibited. More particularly, the rocking modes of the loudspeaker may be pushed outside of the working frequency range of the loudspeaker.

The second suspension element (e.g. damper) may have a position along the movement axis and arranged to radially extend towards and secure to a magnet unit of the drive unit. This may allow for a loudspeaker with a reduced depth compared with a conventional loudspeaker in which the damper typically is above or below the magnet unit (see e.g. FIG. 1).

The second suspension element may extend in a radial direction perpendicular to the movement axis, i.e. may extend in a direction perpendicular to the movement axis.

By arranging the second suspension element to extend perpendicularly to the movement axis, a spatially efficient arrangement may be achieved. This may allow for an improved shallow loudspeaker, particularly where the centre of gravity is located between the landing surfaces, as specified above. The resulting loudspeaker may be both shallow and inhibit diaphragm rocking. This is in contrast to shallow loudspeakers of conventional configuration, which may be particularly prone to diaphragm rocking as a result of the shallow construction.

The diaphragm may have a first radiating surface facing in a forward direction (e.g. away from the frame) and a second radiating surface facing in a rearward direction (e.g. towards the frame).

The translatable part of the drive unit may be located in an aperture through the diaphragm.

An exposed portion of the translatable part of the drive unit may face in the forward direction. Similarly, an inner portion of the translatable part may face in the rearward direction.

The exposed portion may in use dissipate heat generated in the loudspeaker to ambient air. Particularly heat generated as a result of energising the voice coil may be dissipated in this way.

The exposed portion of the translatable part may include structural cooling elements. The structural cooling elements may increase the surface area and thereby improve heat transfer to ambient air. The structural cooling elements may include protrusions or depressions, such as cooling fins or cooling channels.

By providing structural cooling elements on the exposed portion of the translatable part, heat transfer from the translatable part to ambient air may be improved. Particularly where the translatable part includes a thermal conductor with high thermal conductivity (e.g. of at least 20 Watts/(metres*Kelvin)), heat generated as a result of operation may be removed more efficiently from the loudspeaker.

The diaphragm may include a thermal conductor with high thermal conductivity (e.g. of at least 40 Watts/(metres*Kelvin)). Preferably the thermal conductor is formed from a metal or a metal alloy. More preferably, the thermal conductor is formed from aluminium or an aluminium alloy.

In conventional loudspeakers, heat transfer from the voice coil to the diaphragm may be hindered due to a spatial separation of the voice coil and the diaphragm (e.g. caused by using a voice coil former). By contrast, the loudspeaker according to the present disclosure may improve heat transfer to the diaphragm, for example through the translatable part of the drive unit. Furthermore, where the translatable part of the drive unit also has high thermal conductivity, heat transfer from the loudspeaker may be further improved.

The wire from which the voice coil is formed may have any suitable cross-section. The cross-section of the wire may be circular or non-circular. Suitably, the cross-section of the wire is chosen to increase the fill factor of the voice coil. The wire from which the voice coil is formed may have a rectangular cross-section, optionally a square cross-section. Herein, a square can be understood as a subset of rectangular shapes.

Since the voice coil is included in the stationary part secured to the frame, the weight of the voice coil is supported by the frame. By contrast, in a conventional loudspeaker as described above, the voice coil is connected to the diaphragm such that an increased weight of the voice coil may render the diaphragm prone to rocking and therefore an increased fill factor may be undesirable.

In some examples, the stationary part of the drive unit includes a voice coil former (in addition to the voice coil), wherein the voice coil is mounted on (e.g. wound on) the voice coil former.

In some examples, the translatable part of the drive unit is the magnet unit.

The magnet unit (or 'magnet system') may include at least one permanent magnet and may include at least one flux guide (e.g. two flux guides). The at least one flux guide may be configured to guide magnetic flux provided by the at least one permanent magnet to the air gap.

The at least one permanent magnet may have a smaller mass than the mass of the voice coil. That is to say, the at least one permanent magnet may have a first mass, the voice coil may have a second mass, and the first mass may be smaller than the second mass. The first mass may be smaller than the second mass by at least a factor of two.

Thus, by contrast to the conventional loudspeaker described above, the mass of the voice coil may exceed and even greatly exceed the mass of the permanent magnet. Unlike in the conventional loudspeaker, an increase in the mass of the voice coil may not render the diaphragm more prone to rocking since the mass of the voice coil is carried by the frame rather than attached to the diaphragm.

The at least one flux guide may include a yoke, optionally provided as a U-yoke, and may include a washer.

The/each flux guide may be made from a material with high thermal conductivity (e.g. of at least 40 Watts/(metres*Kelvin)), particularly metal or metal alloy. This may help in the dissipation of heat (in addition to the guiding of flux).

The yoke may comprise a base and a sidewall extending from the base.

The thickness of the voice coil in a radial direction perpendicular to the movement axis may be greater than a thickness of the sidewall of the yoke in the radial direction by at least a factor of three, optionally five. The sidewall may have a uniform thickness or a non-uniform thickness. Where the sidewall has a uniform wall thickness, the thickness of the voice coil in the radial direction may be greater than the (uniform) wall thickness in the radial direction, optionally greater by at least a factor of three, optionally five. Where the sidewall has a non-uniform wall thickness, the thickness of the voice coil in the radial direction may be greater than the maximum value of the (non-uniform) wall thickness in the radial direction, optionally greater by at least a factor of three, optionally five.

According to some examples, the magnet unit may comprise one permanent magnet and two flux guides. The two flux guides may be provided as a washer and a yoke. The permanent magnet may be located between the washer and the yoke, The washer and the yoke may be arranged to define the airgap between the washer and a sidewall of the yoke.

According to some other examples, the magnet unit may comprise two permanent magnets and three flux guides. The three flux guides may be provided as a washer and two yokes. The washer may be located between the two permanent magnets arranged with alike poles facing each other. Each yoke may extend from one of the two permanent magnets to define an airgap between the respective yoke and the washer.

According to some other examples, the magnet unit may comprise one permanent magnet and three flux guides provided as two washers and a tubular yoke, e.g. a cylinder-shaped yoke. The permanent magnet may be located between the two washers. The tubular yoke may extend around the permanent magnet and the two washers to define two airgaps between the tubular yoke and the two washers.

The loudspeaker as described above may be provided as a subwoofer configured to produce sound with frequencies in a bass frequency range. The bass frequency range may include 60-80 Hz, more preferably include 40-100 Hz. By way of example, the bass frequency range may be 20 Hz-100 Hz.

The loudspeaker as described above may be provided in an enclosure. The enclosure may define an internal volume of up to 1.5 litres in which the loudspeaker is mounted.

In a second aspect of the invention, there may be provided a loudspeaker assembly comprising a plurality of loudspeakers according to the first aspect of the invention.

For example, there may be provided a first loudspeaker according to the first aspect of the invention and a second loudspeaker according to the first aspect of the invention, which may be arranged in back-to-back configuration such that (e.g. first radiating surfaces of) the first loudspeaker and the second loudspeaker face in opposite directions.

In some examples, there is provided a loudspeaker assembly including:

a first loudspeaker and a second loudspeaker;

the first loudspeaker includes a first frame and a first diaphragm suspended from the first frame, and the second loudspeaker includes a second frame and a second diaphragm suspended from the second frame;

the first loudspeaker comprises a first drive unit and the second loudspeaker comprises a second drive unit;

the first drive unit includes a first stationary part secured to the first frame and a first translatable part secured to the first diaphragm, the first translatable part includes a first magnet unit configured to produce a first magnetic field in a first air gap, the first stationary part of the first drive unit includes a first voice coil configured to sit in the first air gap when the first diaphragm is at rest; and the second drive unit includes a second stationary part secured to the second frame and a second translatable part secured to the second diaphragm, the second translatable part includes a second magnet unit configured to produce a second magnetic field in a second air gap, the second stationary part of the second drive unit includes a second voice coil configured to sit in the second air gap when the second diaphragm is at rest;

wherein at least a portion of the stationary part of the first drive unit is located in a space between the first diaphragm and the second diaphragm when the first and second diaphragms are at rest, and wherein at least a portion of the stationary part of the second drive unit is located in a space between the first diaphragm and the second diaphragm when the first and second diaphragms are at rest;

wherein the loudspeaker assembly is operable to energise the first voice coil and the second voice coil to cause the first magnet unit and the second magnet unit to move along a movement axis in opposite directions, thereby moving the first diaphragm and the second diaphragm to produce sound.

The first voice coil and the second voice coil may be configured to be energised by the same signal. By utilising the same signal, complete cancellation of forces as a result of displacing the first translatable part and the second translatable part may be achieved.

The first loudspeaker and the second loudspeaker may, for example, be provided as 5-inch (12.7 centimetres) subwoofers in an enclosure of approximately 1.5 litres net volume per loudspeaker.

The loudspeaker assembly may include a magnetic shielding member between the first loudspeaker and the second loudspeaker to magnetically shield the magnet units of the first loudspeaker and the second loudspeaker from one another.

By providing the magnetic shielding member, interaction between the magnet unit of the first loudspeaker and the magnet unit of the second loudspeaker may be reduced. In particular, the magnetic shielding member may provide for sufficient magnetic shielding to prevent the magnet units interacting at rest and/or when operating the loudspeaker assembly in normal working range.

The magnetic shielding member may be configured to become saturated with magnetic flux when the magnet unit of the first loudspeaker and the magnet unit of the second loudspeaker approach the magnetic shielding member, thereby causing mutual repulsion of the magnet units.

By including the magnetic shielding and allowing for magnetic saturation thereof, performance of the loudspeakers may be improved and, at the same time, safe operation ensured even when operated at peak power operation as the additional forces experienced by the magnet units may prevent a collision of the translatable parts with the magnetic shielding member or the frame.

The magnetic shielding member may be provided as a sheet of metal or metal alloy, optionally steel.

For avoidance of any doubt, the first and/or second loudspeaker may include any one or more features described in connection with the first aspect of the invention.

A third aspect of the invention may provide a vehicle, e.g. an automobile, comprising a loudspeaker according to the first aspect or a loudspeaker assembly according to the second aspect as described above. More particularly, the loudspeaker or loudspeaker assembly may be provided at a footwell or under the seat of the automobile, or indeed in any other location suitable for packaging a loudspeaker in an automobile.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

The present invention relates to loudspeakers including a frame, a diaphragm and a drive unit. A detailed discussion of examples of traditional loudspeakers follows, for purposes of illustrating the context in which the present invention has been made, before presenting a detailed discussion of the present invention.

Figure 1:
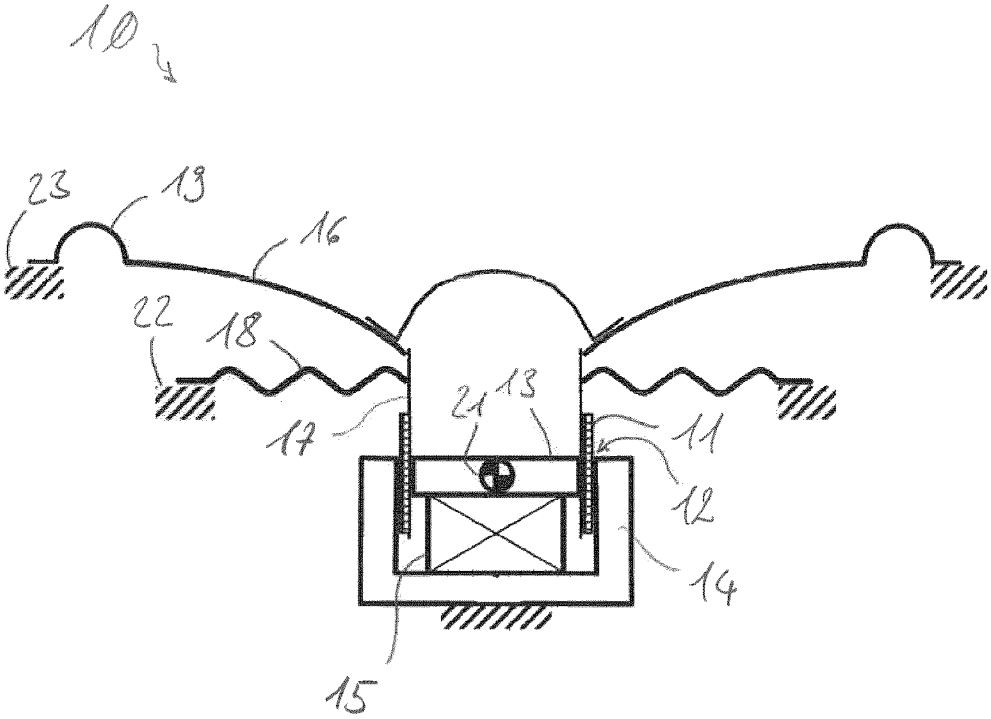
FIG. 1 is a sectional view of a conventional loudspeaker.
Figure 2:
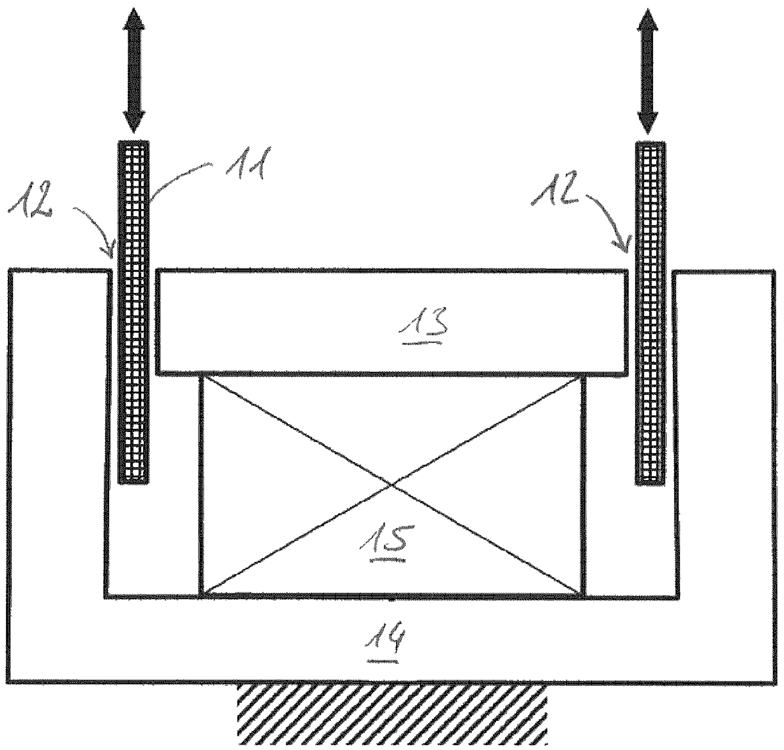
FIG. 2 is a sectional view of a drive unit of the conventional loudspeaker of FIG. 1.

FIGS. 1 and 2 illustrate a traditional loudspeaker 10. In the traditional loudspeaker 10, a voice coil 11 is suspended in an airgap 12 between an inner steel part 13 and outer steel part 14 guiding the magnetic flux of a permanent magnet 15 through the voice coil 11. A loudspeaker cone 16 is connected to the voice coil 11 via a voice coil former 17. Two suspension elements are connected to the voice coil former and the cone; a damper 18 is connected to the voice coil former 17 and a surround 19 is connected to the cone 16. The mass of the voice coil 11 is typically small compared to the mass of the permanent magnet 15 or may be in the same range. Typically, a moving mass of the loudspeaker, i.e. the total mass displaced in operation, is small compared to the total mass of the loudspeaker including magnet unit and frame (not shown).

The force generating element relative to the frame of the loudspeaker 10 are voice coil windings 20 (Lorentz Force). The centre of gravity 21 of these windings 20 is outside of the volume between the two landing surfaces 22, 23 on the frame where the damper 18 and the surround 19 are attached to the frame. This makes the construction prone to rocking of the assembly as a whole which can potentially lead to the coil rubbing against steel parts and damage to the loudspeaker, particularly for heavy coils and/or shallow loudspeaker constructions.

Figure 3:
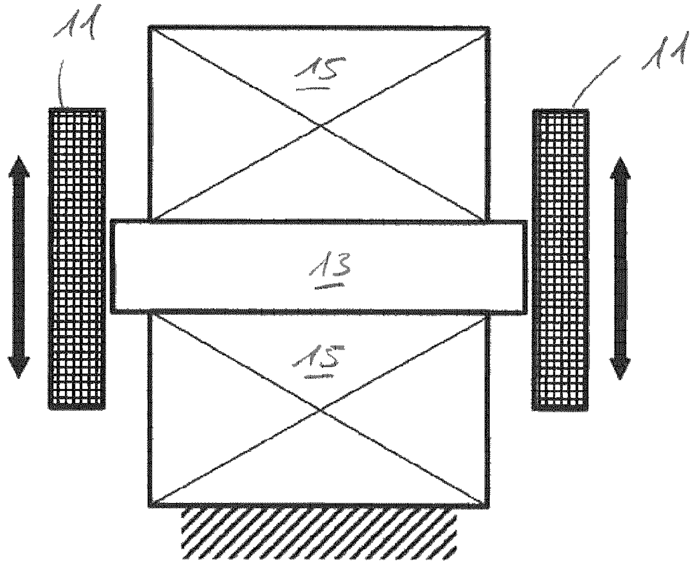
FIG. 3 is a sectional view of a drive unit of another conventional loudspeaker.

FIG. 3 shows an alternative traditional construction, also known as an open magnet system, wherein two permanent magnets 15 are magnetized in opposite direction and push the flux lines through an in-between washer 13. Alternatively, no washer may be present and the permanent magnets 15 are spaced by a non-magnetic element.

In the open magnet system, it is possible to have the centre of gravity of the voice coil between the suspension elements, but such a magnet system may be inefficient as it poses great reluctance to the magnetic flux lines (not shown) due to the comparatively long path through the air. To have acceptable magnet permeance coefficients and useable linearity in terms of the force factor vs displacement of the cone BL (x), the magnets must be tall—and so big in volume and hence expensive. Thin magnets may not be suitable for an open magnet system, because the linear displacement is limited as the windings enter a zone of inverted magnetic flux density for large excursions.

For efficient low frequency reproduction, the moving mass and force factor must be large to counteract the effect of the stiffness from the air volume that a small, closed box poses to a loudspeaker cone. Typically, this large moving mass and large force factor is generated by means of a voice coil having 2 to 6 layers and a strong, large and expensive rare earth magnet in a low reluctance magnetic circuit requiring thick steel components to guide the magnetic flux. To increase the moving mass often a weight, e.g. a brass dustcap is added. A dustcap or heavy diaphragm may also be used to shift the centre of gravity of the whole moving assembly closer to the two suspensions and so decrease rocking risk in application.

A known way of increasing the moving mass is use of a voice coil winding wire with not a round but a rectangular or square cross-section. This increases the motor strength but increases the rocking risk as most of the moving mass is concentrated away from the suspension elements.

As in a traditional loudspeaker the voice coil is moving, flexible leadwires must connect the voice coil windings with the terminal on the frame. Leadwires are prone to ticking noise, over-stretching during operation, must be connected to the windings, e.g. via a solder connection on the voice coil former, and are generally to be avoided.

For heavy moving mass woofers as described above, the counter-force on the frame and enclosure is large. It is known to mount two loudspeakers on opposing faces of an enclosure, i.e. in back-to-back configuration, to cancel out the net force on the enclosure. However, this leads to a necessary long elongation of the enclosure along the principle axis of the loudspeakers when so mounted due to the depth of the loudspeakers.

For subwoofer loudspeaker of e.g. 5 to 6 inches of nominal diameter, the above considerations pose severe limitations for the loudspeaker designer. On the market we hardly see loudspeakers in this range with a moving mass of more than 100 g (grams) or suitable for use in an enclosure smaller than two litres. However, such a moving mass is necessary to reach an in-box resonance frequency of close to or below 50 Hz (Hertz) suitable for subwoofer application. If such loudspeakers are designed, they typically come with a big and expensive magnet system to allow for a reasonable in-box quality factor Qtc <3 controlling the high moving mass making them suitable for music reproduction. The current world market price of rare earths needed for high temperature stable magnets with high remanent flux density such as NdFeB+Dy magnets prohibit such loudspeakers to be widely used in automotive or consumer applications.

Hence, there is a need for an improved loudspeaker. The examples discussed below may provide for one or more of low-cost, lightweight, a shallow (subwoofer) driver with high moving mass but rocking stability, easy to manufacture and suitable for back-to-back mounting for force cancelling operation.

Aspects and embodiments of the present invention will now be discussed with reference to the accompanying FIGS. 4 to 19. The invention is related to low frequency sound reproduction, more specifically to loudspeaker music playback from a small, closed box volume. Further aspects and embodiments will be apparent to those skilled in the art. All documents mentioned in this text are incorporated herein by reference.

Figure 4:
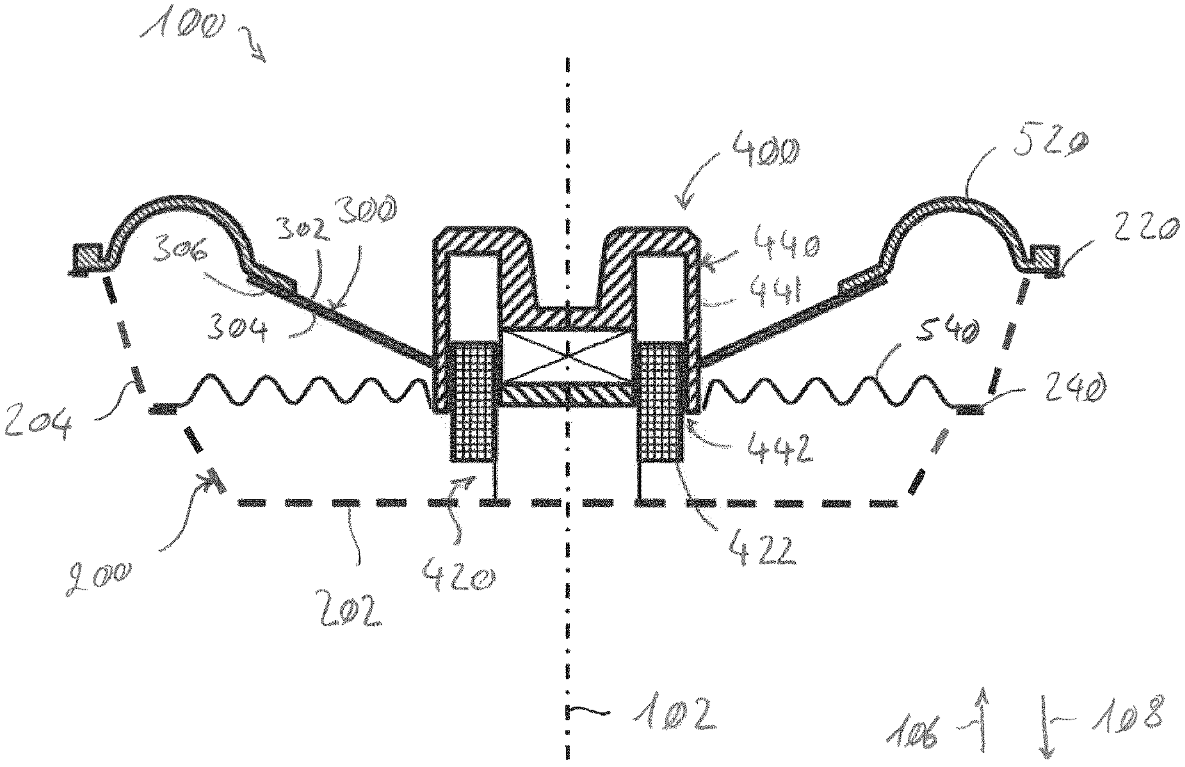
FIG. 4 is a sectional view of a loudspeaker according to the present disclosure.

FIG. 4 is a sectional view of an exemplary loudspeaker 100. The loudspeaker 100 includes a frame 200, a diaphragm 300 suspended from the frame 200, and a drive unit 400.

The drive unit 400 has a stationary part 420 and a translatable part 440. The stationary part 420 is secured to the frame 200 and includes a voice coil 422. The translatable part 440 is secured to the diaphragm 300 and includes a magnet unit 441 configured to produce a magnetic field in an air gap 442. When the diaphragm 300 is at rest, the voice coil 422 sits in the air gap 442.

The loudspeaker 100 is operable to energise the voice coil 422 to cause the magnet unit 441 to move relative to the voice coil 422, along a movement axis 102, thereby moving the diaphragm 300 along the movement axis 102 to produce sound.

The diaphragm 300 has a first sound radiating surface 302 and a second sound radiating surface 304. The first sound radiating surface 302 faces in a forward direction 106 (away from the frame 200) and is in use utilised for producing sound. The second sound radiating surface 304 faces in a rearward direction 108, i.e. into the frame 200. The forward direction 106 and the rearward direction 108 are opposite directions parallel to the movement axis 102.

Note that the air gap 442 faces in the rearward direction, and which inhibits the accumulation of dust without the need for a dustcap as seen in some conventional loudspeakers.

The frame 200 of the loudspeaker 100 includes a base portion 202 and a rim 204. The base portion 202 extends radially outwardly with respect to the movement axis 102. The rim 204 extends axially with respect to the movement axis 102, that is at least partly along the movement axis 102. The rim 204 of the frame 200 is positioned at the periphery of the base portion 202 and is positioned radially outwardly of the magnet unit 441.

The stationary part 420 of the drive unit 400 is secured to the base portion 202 of the frame 200 while the diaphragm 300 and the translatable part 440 of the drive unit 400 are suspended from the frame 200 by means of suspension elements 520, 540. The suspension elements 520, 540 are configured to allow movement along the movement axis 102, i.e. in a direction parallel to the movement axis 102, and inhibit movement in a radial direction 104 (shown in FIG. 5), i.e. in a direction perpendicular to the movement axis 102.

A first suspension element 520 is attached to the frame 200 at a first landing surface 220 defined by the rim 204 of the frame 200. The first suspension element 520 is provided as a surround secured to an outer edge 306 of the diaphragm 300.

A second suspension element 540 is attached to the frame 200 at a second landing surface 640 defined by the rim 204 of the frame 200. The second suspension element 540 is provided as a damper secured to the translatable part 440 of the drive unit 400 and extends radially outwardly with respect to the movement axis 102.

Figure 5:
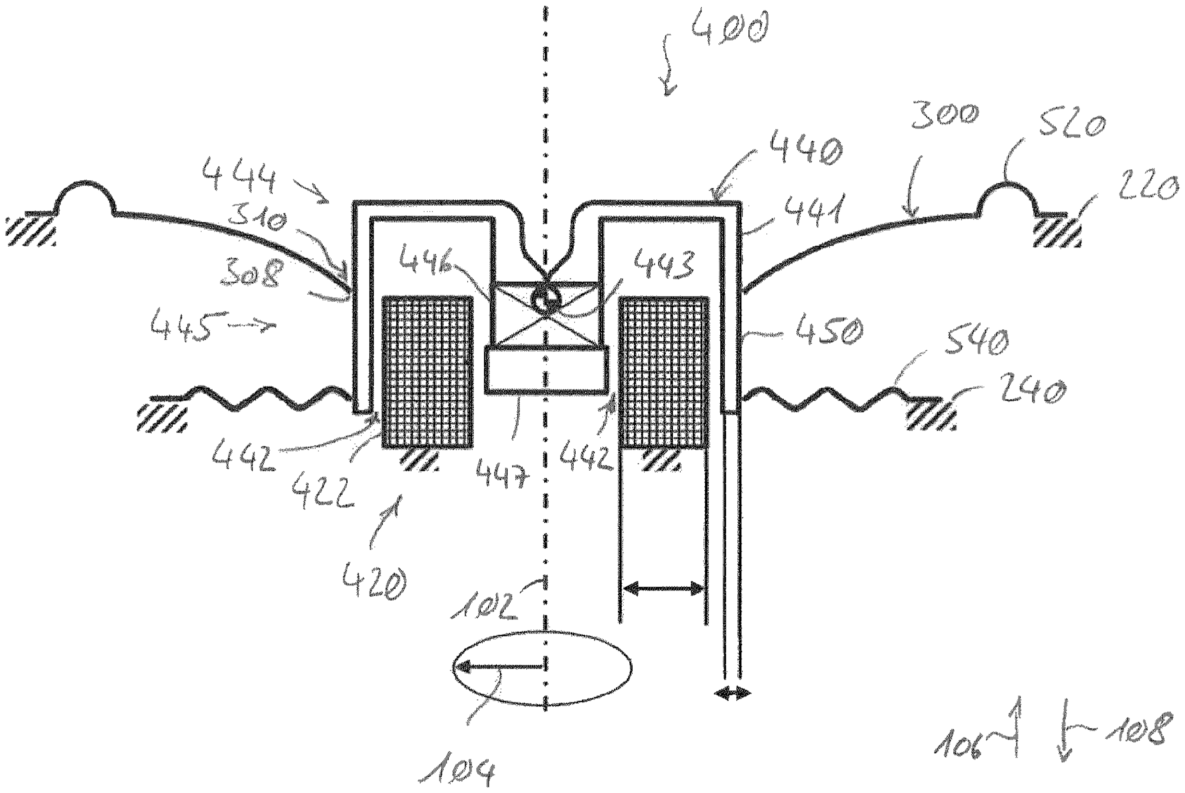
FIG. 5 is a sectional view of part of the loudspeaker of FIG. 4.

FIG. 5 is a sectional view of part of the loudspeaker 100 and shows the diaphragm 300, the drive unit 400, and the suspension elements 520, 540.

The diaphragm 300 and the second suspension element 540 are secured to the translatable part 440 of the drive unit 400 such that the centre of gravity 443 of the translatable part 440, indicated by a chequer-patterned disk, is located between the first landing surface 220 and the second landing surface 240. That is to say, the first landing surface 220 and the second landing surface 240 are spaced apart along the movement axis 102 and the centre of gravity 443 of the translatable part 440 is located therebetween.

The magnet unit 441 is suspended by the second suspension element 540, which in this example provided as a damper, connecting the magnet unit 441 to the frame 200. The magnet unit 441 is also suspended via the diaphragm 300, in this example provided as a cone, and the first suspension element 520, in this example provided as a rubber surround, which is also connected to the frame 200. Accordingly, the centre of gravity 443 of the magnet unit 441 is located along the movement axis 102 and between the two landing surfaces 220, 240 of the suspension elements 520, 540 to the frame 200.

The diaphragm 300 has an inner edge 308. The inner edge 308 defines a diaphragm aperture 310, i.e. bounds the diaphragm aperture 310. The diaphragm aperture 310 extends through the diaphragm 300, i.e. extends from the first sound radiating surface 302 to the second sound radiating surface 304.

The translatable part 440 of the drive unit 400 extends through the diaphragm aperture 310. Thus, an exposed portion 444 (or 'first portion') of the translatable part 440 is located one side of the diaphragm 300, while an inner portion 445 (or 'second portion') of the translatable part 440 is on the other side of the diaphragm 300. More particularly, the exposed portion 444 faces in the forward direction 106 and the inner portion 445 faces in the rearward direction 108. The exposed portion 444 of the translatable part 440 is in use located outside of the volume enclosed by the frame 200 and the diaphragm 300, i.e. is exposed to ambient air.

Some conventional loudspeakers are mounted with the magnet unit towards the inside of the frame/enclosure. This leads to increased temperature in the enclosure, limiting the power handling of the loudspeaker, especially when also active electronics, such as an amplifier, are present. The exemplary loudspeaker 100 has the magnet unit towards the outside of the frame/box which may allow for much better heat radiation. It also allows equipping the translatable part 440 with cooling fins, see FIG. 19, or using a metal cone (e.g. from Aluminium) as an additional heat sink, as it is directly connected to the translatable part 440 while having the airgap 442 protected inside the box/frame; away from dust and debris.

Figure 6:
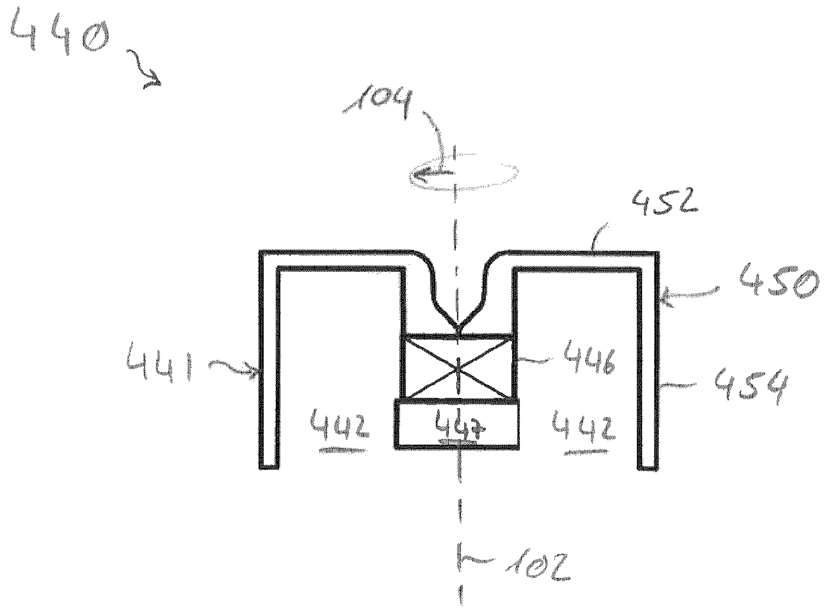
FIG. 6 is a sectional view of a drive unit of the loudspeaker of FIG. 4.

FIG. 6 is a sectional view of the translatable part 440. In this example, the translatable part 440 of the drive unit 400 corresponds to the magnet unit 441.

The magnet unit 441 is in use arranged in the loudspeaker 100 such that the air gap 442 is open towards the frame 200, as shown FIG. 4, and the voice coil 422 extends into the air gap 442 in the forward direction 106.

The magnet unit 441 includes a permanent magnet 446, a (magnetic) washer 447 and a (magnetic) yoke 450. The permanent magnet 446, the washer 447, and the yoke 450 are axially symmetric about the movement axis 102, though other arrangements are possible.

The permanent magnet 446 is provided as a rare earth magnet. The permanent magnet 446 has a mass which is smaller than the mass of the voice coil 422. In this example, the mass of the voice coil 422 is greater than the mass of the permanent magnet 446 by a factor of two, i.e. the mass of the voice coil 422 is two times greater than the mass of the permanent magnet 446.

The washer 447 and the yoke 450, which in this example is provided as a U-yoke, are configured to guide magnetic flux generated by the permanent magnet 446 to the air gap 442 between the washer 447 and the yoke 450.

The yoke 450 has a base 452 and a sidewall 454 projecting from the base 452. The base 452 extends in the radial direction 104, while the sidewall 454 extends axially with respect to the movement axis 102.

As the suspension elements 520, 540 are mounted on the outside of the sidewall 454 the yoke 450, the centre of gravity 443 of the moving, force generating element—in this case the magnet unit 441—can be between the second suspension element 540 (damper) and the first suspension element 520 (surround), which may lead to excellent rocking stability and pure, axial motion. Moreover, having the suspension radially adjacent to the yoke 450 may allow for very shallow designs, enabling back-to-back force-cancelled operation in a small box as described with reference to FIG. 7.

The sidewall 454 of the yoke 450 has a (uniform) thickness bounded radially, i.e. in the radial direction 104. The voice coil 422 also has a (uniform) thickness bounded radially. The thickness of the voice coil 422 is greater than the thickness of the sidewall 454 of the yoke 450. A ratio of the thickness of the voice coil 422, i.e. the "winding thickness", over the thickness of the sidewall 454 of 3:1 or even 5:1 is preferred. A traditional speaker of same size may have a ratio as little as 0.2:1.

The loudspeaker 100 makes use of an exceptionally big voice coil using many layers in a magnetic circuit. However, as the air-gap is much wider as compared to a traditional loudspeaker to accommodate the big voice coil, the total reluctance in the magnetic circuit increases so much that the cross-sections of the flux guiding washer and yoke parts can be thin.

This new configuration leads to a comparably high voice coil mass and comparably low magnet unit mass. Accordingly, has been found beneficial to fix the voice coil 422 to the frame 200 and let the magnet unit 441 be free to oscillate by means of two or more suspension elements 520, 540 as then more of the total mass of the loudspeaker 100 is active and moving.

The drive unit 400 leads to high moving mass at low overall driver mass. A ratio of moving mass to total mass of up to 1:3, preferably up to 1:2, is possible. Also, a ratio of magnet mass to voice coil winding mass of 1:2, preferably up to 1:4, can be reached. This leads to surprisingly lightweight subwoofers with low resonance frequency in box.

Figure 7:
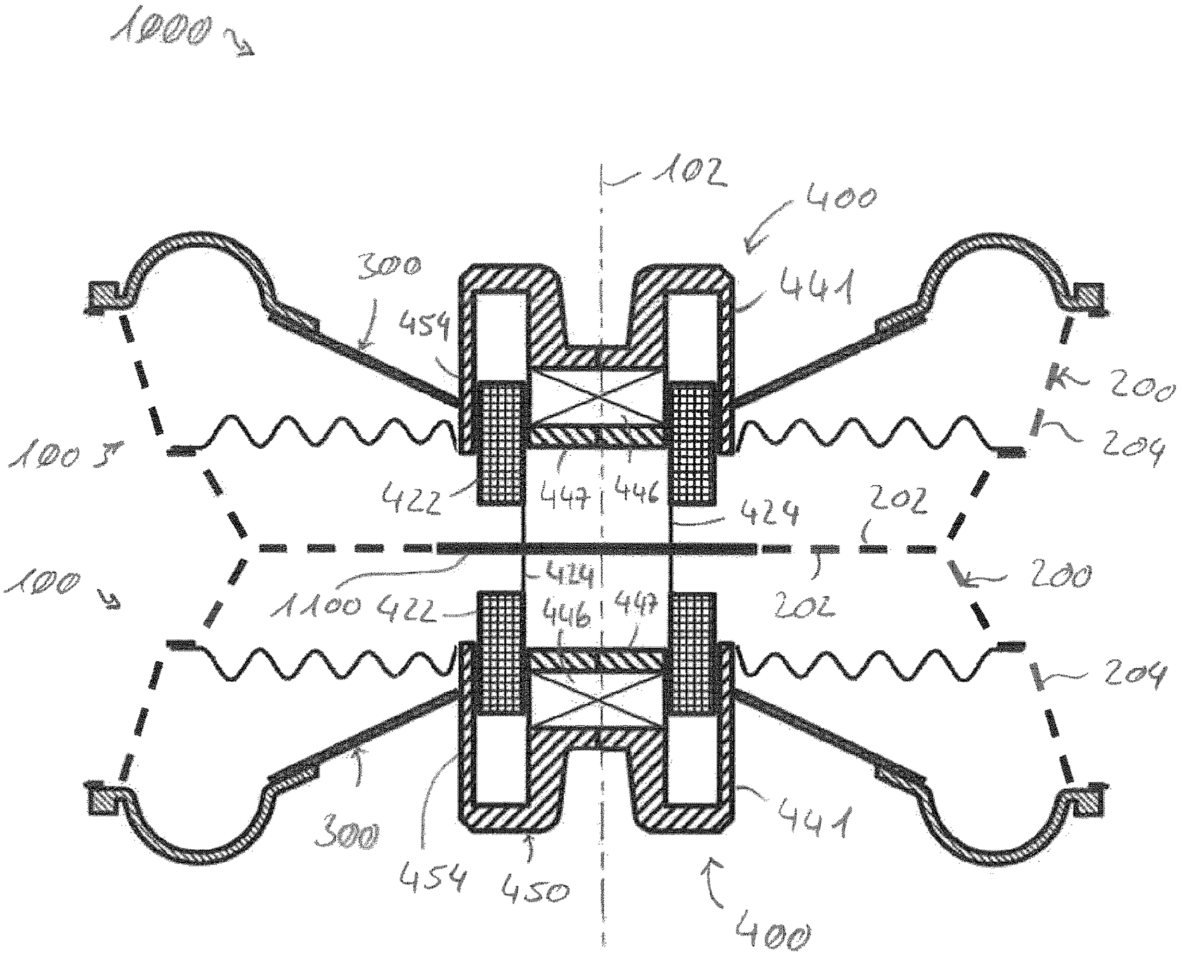
FIG. 7 is a sectional view of a loudspeaker assembly according to the present disclosure.

FIG. 7 is a sectional view of an exemplary loudspeaker assembly 1000 according to the present disclosure. The loudspeaker assembly 1000 includes a first loudspeaker 100 and a second loudspeaker 100 as described above and arranged in a back-to-back configuration, facing into opposite directions.

The frames 200 of the loudspeakers 100 are joined at their respective base portions 202. In this example, the base portions 202 are formed separately and joined by means of adhesive, it is also envisaged that the base portions 202 could be formed integrally with one another. The resulting configuration of the loudspeaker assembly 1000 is such that the base portions 202 serve as a divider between the volumes enclosed by each loudspeaker 100.

The rims 204 of the loudspeakers 100 extend in opposite direction from the respective base portion 202 of the frame 200.

The diaphragms 300 are located on opposite sides of the loudspeaker assembly 1000.

The drive units 400 of the loudspeakers 100 are located between the diaphragms 300. The translatable parts 440 of the drive units 400 are moveable along the movement axis 102, which is common to both loudspeakers 100.

The loudspeaker assembly 1000 is operable to energise the voice coil 422 of the first loudspeaker 100 and the voice coil 422 of the second loudspeaker 100 in order to cause the magnet unit 441 of the first loudspeaker 100 and the magnet unit 441 of the second loudspeaker 100 to move along the movement axis 102, thereby moving the diaphragms 300 of both loudspeakers 100 and producing sound. In this example, the voice coils 422 of the loudspeakers 100 are configured to receive the same signal to cause the voice coils 422 to be energised.

Figure 8:
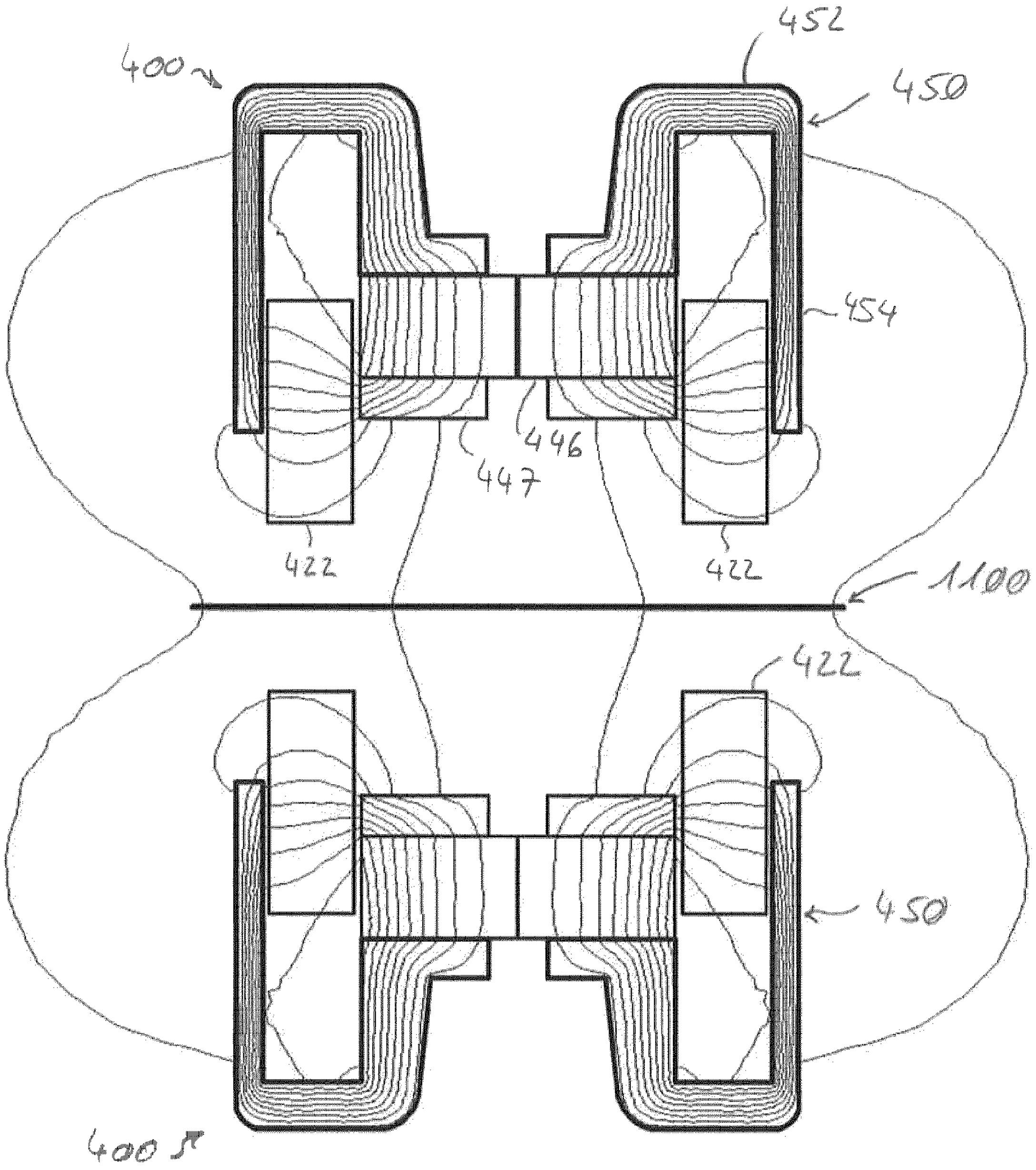
FIG. 8 is a sectional view of a pair of drive units of the loudspeaker assembly of FIG. 7.

The loudspeakers 100 are provided as 5-inch (12.7 centimetres) subwoofers for use up to 100 Hz in an enclosure (closed box) of approximately 1.5 litres net volume per loudspeaker 100. In FIG. 8, the two loudspeakers 100 are mounted back-to-back in a closed box volume of 3 litres in total, designed for a nominal stroke of +−10 mm (millimetres).

The washer 447 of each loudspeaker 100 has a thickness of 3 mm, which may effectively guide the magnetic flux through the voice coil windings. The thickness of the sidewall 454 of the yoke 450 adjacent to half the height of the voice coil windings is 2 mm. In this example, the sidewall 454 has uniform thickness.

The permanent magnet 446 is 24 mm (millimetres) in diameter and 8 mm in height and has a weight of 28 g (grams). This is considered to be an exceptionally small and lightweight magnet for a subwoofer with this application.

The moving mass of each loudspeaker 100, i.e. the mass of the translatable part 440 of each loudspeaker 100, is approximately 160 g.

The voice coil 422 of each loudspeaker 100, wound on a voice coil former 424 fixed to the respective frame 200, has 17 mm winding height along the movement axis 102, at a winding thickness of 6.4 mm in the radial direction 104. The weight of the voice coil windings is 75 g.

These parameters lead to a ratio of magnet weight to coil weight of 1:2.8. The ratio of the voice coil winding thickness to the thickness of the sidewall 454 of the yoke 450 is 3.15:1.

The frame 200 of each loudspeaker 100, which in this example is made from plastic, weighs 50 g.

The total mass of each loudspeaker is below 300 g, while the total mass of the loudspeaker assembly 1000 is below 600 g, with a total moving mass of 320 g. In operation, 160 g of moving mass per loudspeaker 100 are moving in opposite directions leading to no net force on the enclosure. Thus, it may be possible to achieve the same or comparable maximum output and resonance frequency from the loudspeaker assembly 1000 with a volume of 3 litres as a comparatively heavy, high-performance single 8-inch (20.32 centimetres) subwoofer in a volume of approximately 15 litres. Such a great decrease in package and reduction of vibration of the enclosure may allow subwoofer placement in positions where the sheer size previously prohibited subwoofer application. This can be e.g. close to the bottom of the A-style or between the foot wells in a car cabin.

Figure 9:
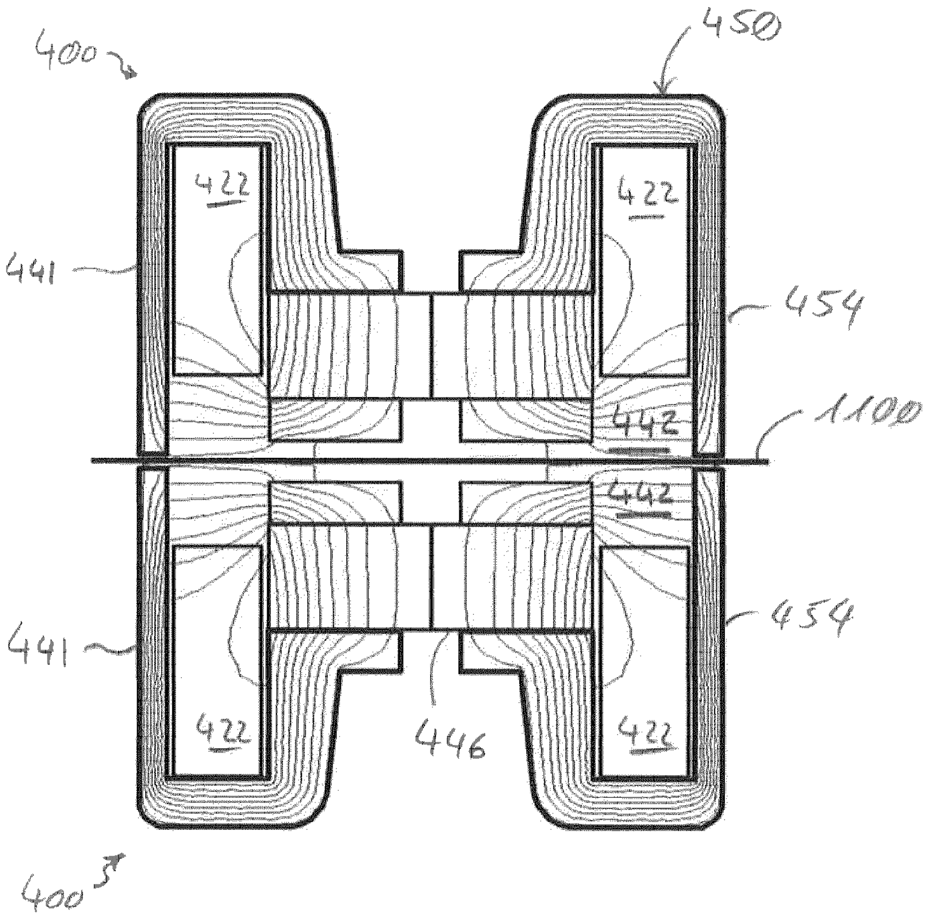
FIG. 9 is another sectional view of the pair of drive units of the loudspeaker assembly of FIG. 7.

FIGS. 8 and 9 are sectional views of the drive units 400 of the loudspeaker assembly 1000, illustrating the magnetic flux in different configurations of the drive units 400. In FIG. 8, the drive units 400 are shown at rest, i.e. the voice coils 422 are not energised and the translatable parts 440 of each drive unit 400 are located in at corresponding rest positions. In FIG. 9, the translatable parts 440 are displaced towards each other. That is to say, displacement is negative in FIG. 9.

With the two drive units 400 mounted back-to-back, there is an additional force acting on the magnet units 441. Due to the large airgaps 442 in the individual magnet units 441 with alike poles facing each other, the individual leakage fluxes of the magnet units 441 may push the magnet units 441 apart. To mitigate this effect at rest position and during the normal working range of the loudspeakers 100, a magnetic shielding member 1100 is added. In this example, the magnetic shielding member 1100 is provided as thin sheet of mild steel of 50 mm diameter and 0.5 mm thickness.

The magnetic shielding member 1100 is provided on the junction between the two loudspeaker frames 200, i.e. where the base portions 202 are joined (see FIG. 7). The magnetic shielding member 1100 shields the two magnet units 441 from each other. According to the present example, the magnetic shielding member 1100 is configured to shield up to the point where the magnet units 442 get very close to each other, exceeding normal working range, e.g. at approximately −10 mm displacement. In this example, this is the limit for normal operation and displacements beyond that are not intended.

The magnetic shielding member 1100 is configured so that beyond the nominal displacement the magnetic shielding member 1100 fully saturates by the leakage flux of the two magnet units 441. For example, the thickness of the sheet of mild steel may be chosen such that full saturation occurs accordingly.

When the magnetic shielding member 1100 is fully saturated, the two magnet units 441 push each other apart through the magnetic shielding member 1100. In this example, this may be creating up to −50 N (Newtons) of force relative to the frame 200 (or 100 N relative to each other, with reference to the magnet units 441). This additional force may make it difficult or even impossible for the magnet units 441 to hit the frame 200 for negative displacements even when operated at peak power and so may ensure safe operation even during peak power operation.

Figure 10:
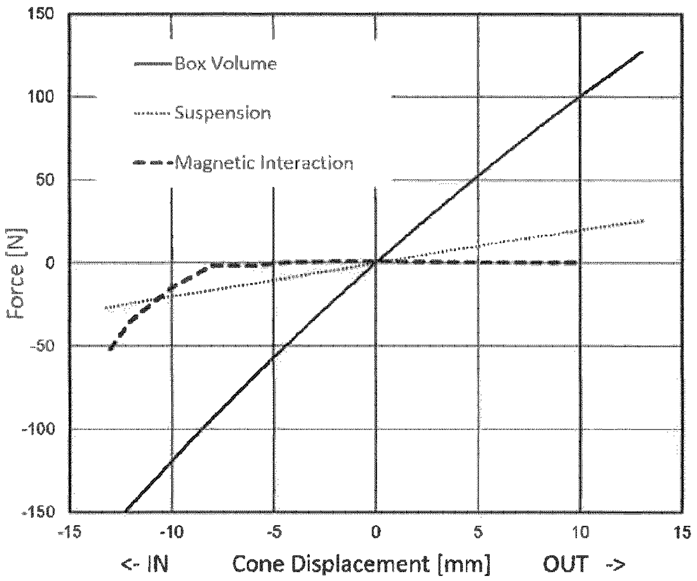
FIG. 10 is a graph illustrating performance parameters of the loudspeaker assembly of FIG. 7.
Figure 11:
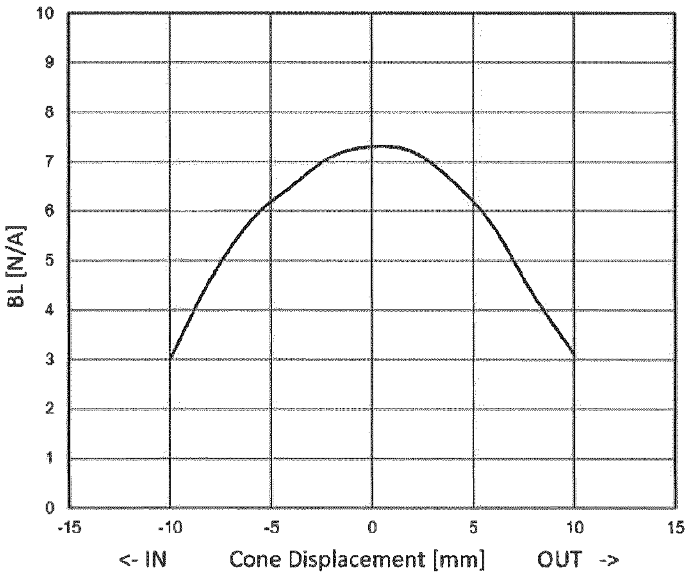
FIG. 11 is another graph illustrating performance parameters of the loudspeaker assembly of FIG. 7

FIGS. 10 and 11 show graphs illustrating performance parameters of the loudspeaker assembly 1000.

FIG. 10 illustrates the forces acting on the translatable part 440 relative to the frame 200. The solid line represents the restoring force of the entrapped air volume acting on the cone, 1.51, 108 cm2. The dotted line represents the restoring force of the mechanical suspension elements. The dashed line represents the restoring force of the magnetic interaction between the magnet units.

FIG. 11 illustrates the force factor BL (x) for each drive unit 400 relative to the respective frame 200.

The entrapped air inside the enclosure, i.e. closed box, acts as additional, axial stiffness on the diaphragm 300 (provided as a cone) of each loudspeaker 100. For a displacement of +−13 mm of an effective radiating surface area of 108 cm2 (square centimetres) on 1.5 litres, this leads to a force of up to −150 N and +130 N respectively. In comparison, the force of the suspension elements 520, 540 is small with up to +−25 N.

As the loudspeakers are joined back-to-back, the net force on the base portion 202 of each individual frame 200 is nil and allows the frame 200 to be thin and lightweight. The force factor vs displacement of each drive unit 400 is symmetric and drops to 50% relative to the rest position at +–8 mm, leading to low distortion over a wide displacement range.

Having the magnetic shielding member 1100 close to magnetic saturation at approx. 1.6 Teslas allows keeping the inductance so low that it may have little influence on the frequency response in the working range up to 100 Hz. In fact, the higher inductance compared to a traditional loudspeaker with fewer windings, and consequently lower inductance, leads to decreased higher order distortions due to the decreasing output for higher frequencies above 100 Hz.

Figure 12:
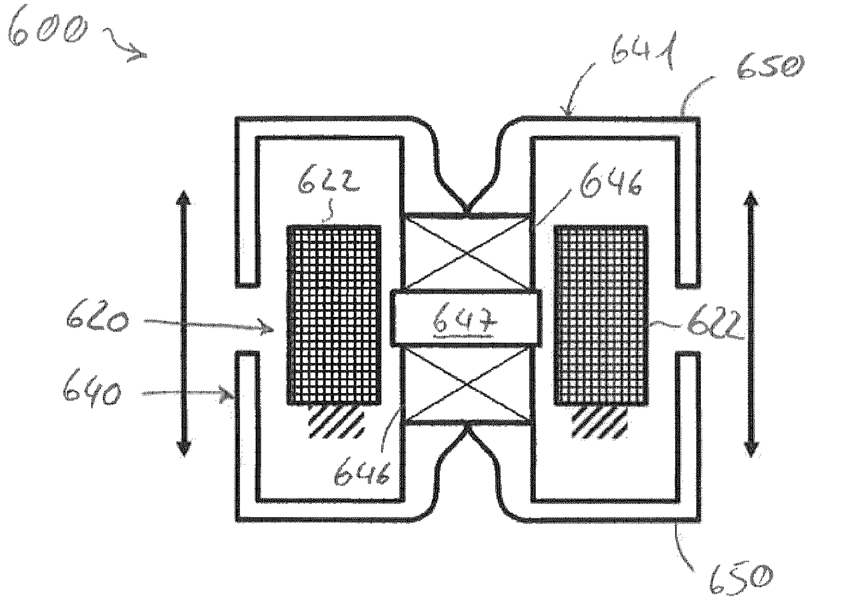
FIG. 12 is a sectional view of another drive unit.
Figure 13:
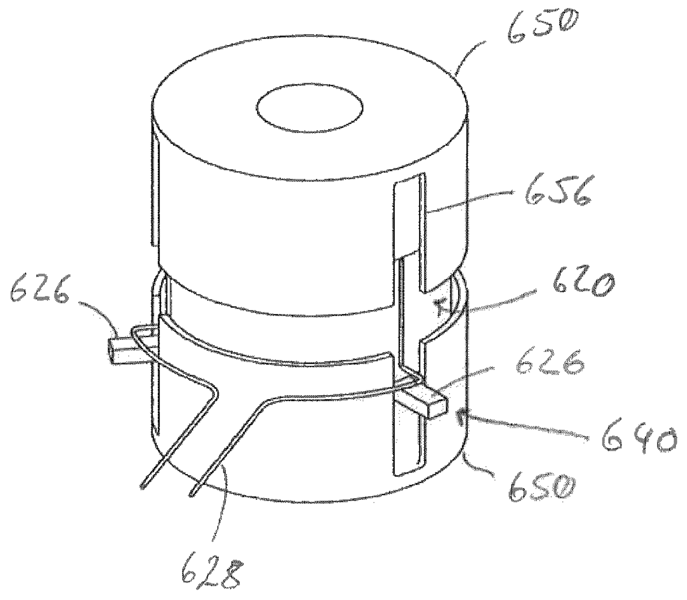
FIG. 13 is a perspective view of a drive unit of FIG. 12.

FIGS. 12 and 13 show another example of a drive unit 600. FIG. 12 is a sectional view of the drive unit, while FIG. 13 is a perspective view of the drive unit 600. For ease of assembly, the magnet unit of FIG. 4 above may be preferable, consisting of only three separate component parts. However, alternative configurations of magnet units with other advantages are envisaged.

The drive unit 600 is similar to the drive unit 400 described above and detailed description of similar parts is omitted.

The drive unit 600 comprises a stationary part 620 and a translatable part 640. The stationary part 620 comprises a voice coil 622. The translatable part 640 comprises a magnet unit 641.

The magnet unit 641 includes two permanent magnets 646 arranged with alike poles facing each other. The two permanent magnets 646 are fixed to a washer 647 pushing the flux radially outwards. Two U-yokes 650 are used to guide the flux around the voice coil windings and radially through the voice coil windings. This arrangement may allow for a voice coil with smaller inner diameter as the permanent magnet volume can be distributed over two permanent magnets 646 acting in parallel on the same voice coil windings.

In this example, the voice coil 622 is fixed to the frame 200 radially through arms 626 protruding the slits 656 in the U-yokes. The arms 626 protruding the slits 656 are also helpful for leadouts 628 of the voice coil 622. The term "leadout" is understood to refer to wiring which is not flexible, unlike leadwires which are understood to be flexible.

The described arrangement may be less shallow than the arrangement described with reference to FIGS. 4 to 11, but still similar in height to a traditional loudspeaker. Also, the rocking resistance may be outstanding as the suspension elements can be spaced further apart than in a traditional loudspeaker.

Figure 14:
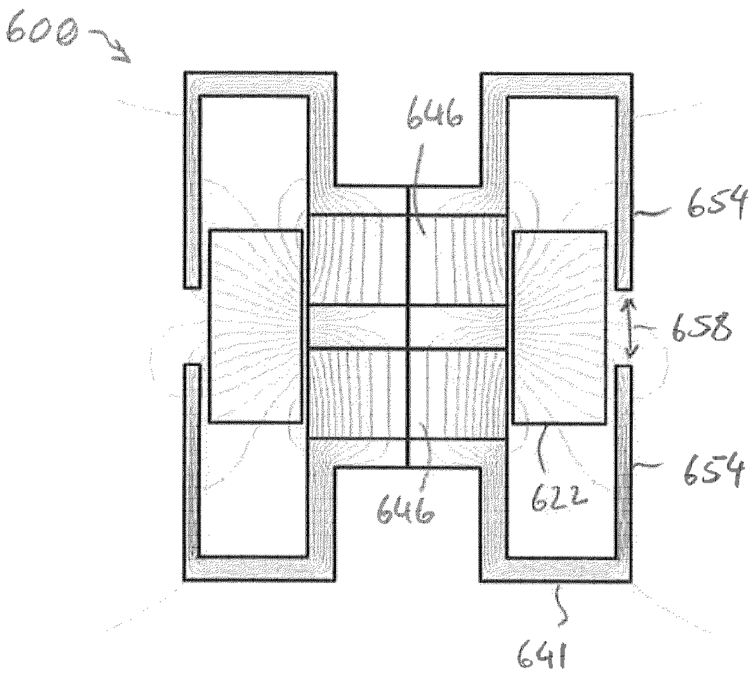
FIG. 14 is another sectional view of the drive unit of FIG. 12.
Figure 15:
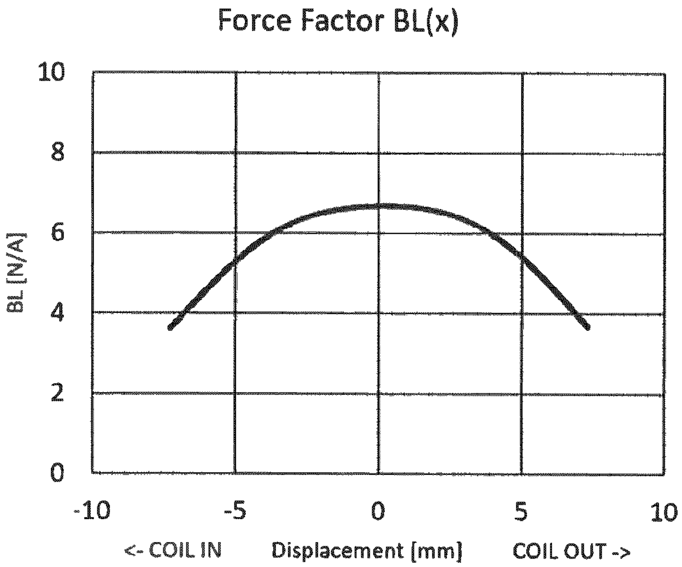
FIG. 15 is a graph illustrating performance parameters of the drive unit of FIG. 12.

FIGS. 14 and 15 illustrate the magnetic properties of the drive unit 600 of FIGS. 12 and 13.

The symmetric arrangement of the permanent magnets 646 results in a symmetric BL (x) curve with almost no leakage flux despite the comparatively large airgap. Also, it is possible to introduce a gap 658 between the sidewalls 654 (or 'outside portions') of the U-yokes 650 to decrease the moving mass and cost of the parts as the flux lines will anyway take the lowest reluctance path entering sidewalls 654 under an angle and not strictly radial.

Compared to a traditional open magnet system or a U-yoke magnet system with a countermagnet, the permeance coefficient of both permanent magnets 646 is high as they are both loaded by the magnetic circuit with U-yokes 650 with comparably low overall reluctance. Also, the large surface area of both U-yokes 650 may act as very effective heatsink. Both, the good heat dissipating properties of this design and the high permeance coefficient allow the use of low-cost permanent magnets, e.g. Neodymium magnets, with low demagnetization resistance.

Figure 16:
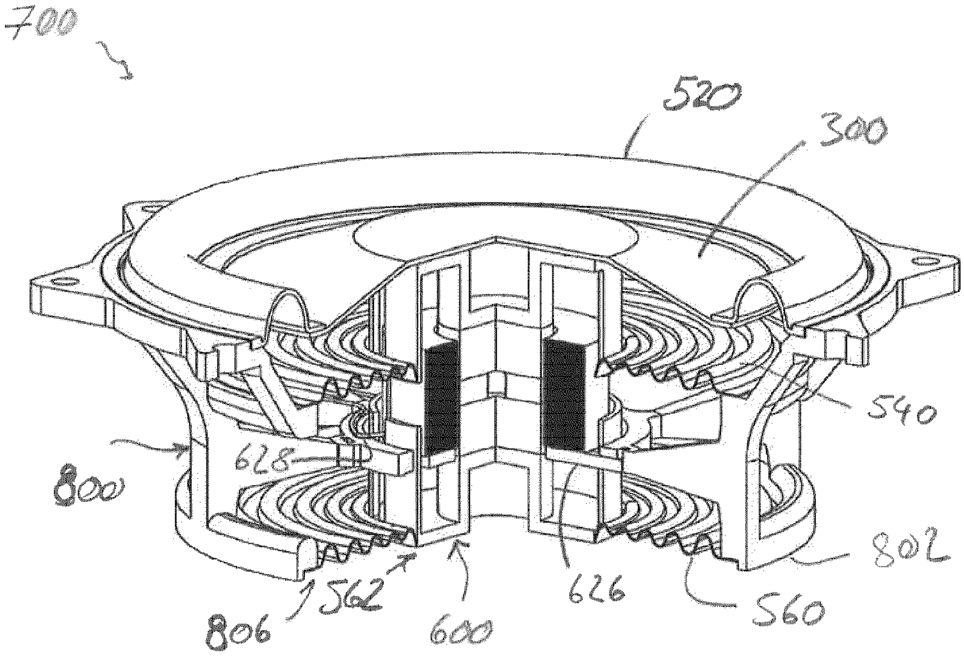
FIG. 16 is a partially broken-away perspective view of a loudspeaker with the drive unit of FIG. 12.
Figure 17:
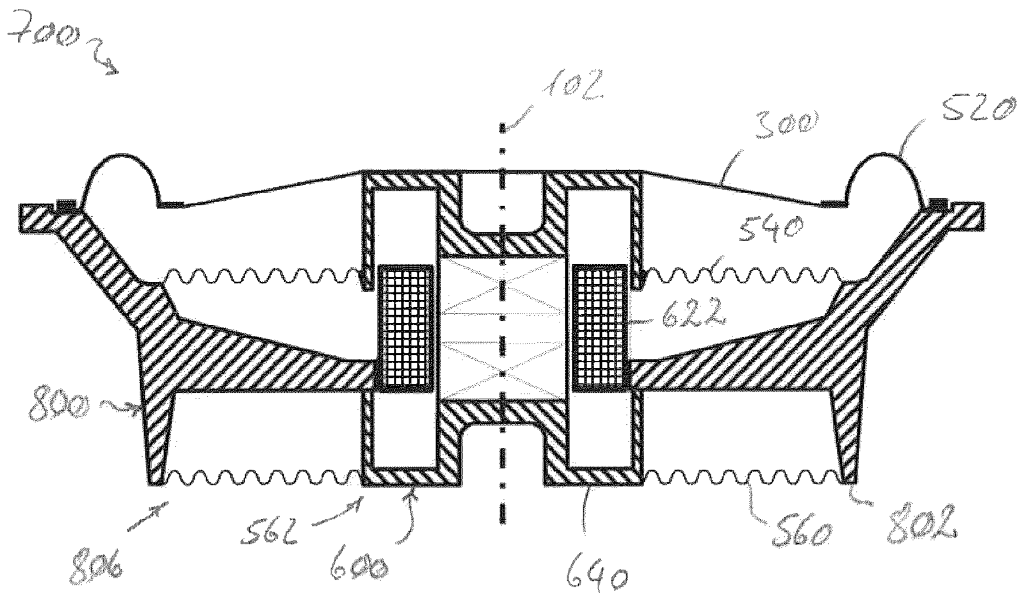
FIG. 17 is a sectional view of the loudspeaker of FIG. 16.

FIGS. 16 and 17 show an exemplary loudspeaker 700 comprising the drive unit 600 described with reference to FIGS. 12 to 15. More particularly, FIG. 16 is a broken-away perspective view of the loudspeaker 700, while FIG. 17 is a sectional view of the loudspeaker 700.

The loudspeaker 700 is similar to the loudspeaker 100 described above with reference to FIG. 4. A detailed description of corresponding parts is omitted.

The loudspeaker 700 comprises a frame 800, the diaphragm 300, and the drive unit 600. A stationary part 620 of the drive unit 600 is secured to the frame 800. The diaphragm 800 and the translatable part 640 of the drive unit 600 are suspended from the frame 800. In this example, a third suspension element 560 is provided that is secured to the translatable part 640 of the drive unit 600.

The drive unit 600 extends from the front of the loudspeaker 700 to the rear of the loudspeaker 700. More particularly, the drive unit 600 extends from the diaphragm 300 along the movement axis 102, all the through a rear aperture 562 in the third suspension element 560. The third suspension element 560 is provided in a base aperture 806 of the base portion 802 of the frame 800. The translatable part 640 protrudes in the rearward direction 108 from the rear aperture 562.

In operation, the rear of the loudspeaker 700 as defined by the second suspension element and the translatable part 640 also moves when the loudspeaker 700 is operated.

Figure 18:
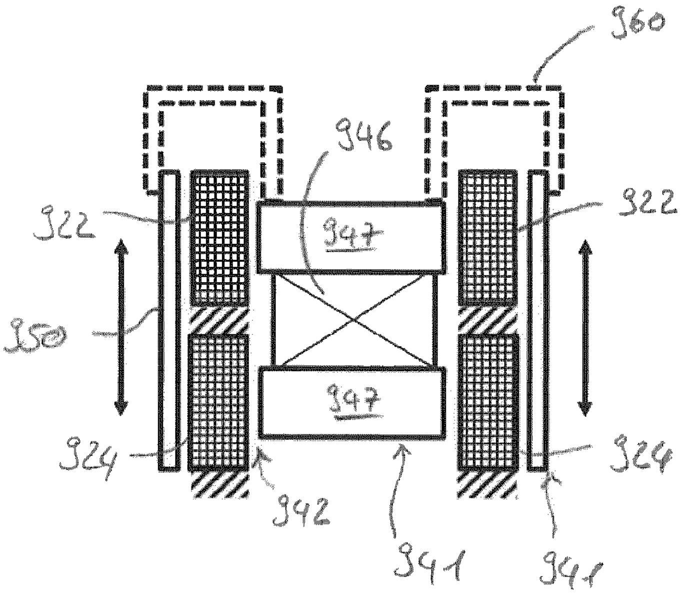
FIG. 18 is a sectional view of another drive unit.

FIG. 18 is a sectional view of another exemplary drive unit 900. The drive unit 900 is similar to the drive units 400, 600 and detailed description of like parts is omitted.

The drive unit 900 has a stationary part 920 and a translatable part 940. The translatable part 940 includes a magnet unit 941, comprising a single permanent magnet 946, configured to produce a magnetic field in an air gap 942.

The stationary part 420 comprises a first voice coil 92 and a second voice coil 924. The voice coils 922, 924 sit in the air gap 942 when the diaphragm is at rest. Hence, the drive unit utilises one permanent magnet and two voice coils.

The permanent magnet 946 is located between two washers 947 that are used for guiding the flux lines through to both voice coil windings with a cylinder-shaped magnetic yoke 950 adjacent to the outside of the voice coils 922, 924. The cylinder-shaped magnetic yoke 950 does not have a base portion 425 extending in the radial direction 104, as described with reference to the yoke 450. Instead, the cylinder-shaped magnetic yoke 950 extends only axially.

An inner portion of the magnet unit 941, i.e. the permanent magnet 946 and the washers 947, is mechanically connected with an outside of the yoke 950 by at least one non-magnetic member 960 (dashed lines in FIG. 18), ensuring the flux lines are guided through the voice coil windings. In this example, the non-magnetic member 960 is provided as an annular bracket.

The described arrangement is symmetric and may provide all the advantages of allowing the fixation of the suspension elements and diaphragm to the outside of the magnet unit. The described arrangement further has the benefit that the voice coils 922, 924 are connected in such a way (or wound with opposite winding direction) that their inductance partially cancels, which may improve performance particularly at higher frequencies.

Figure 19:
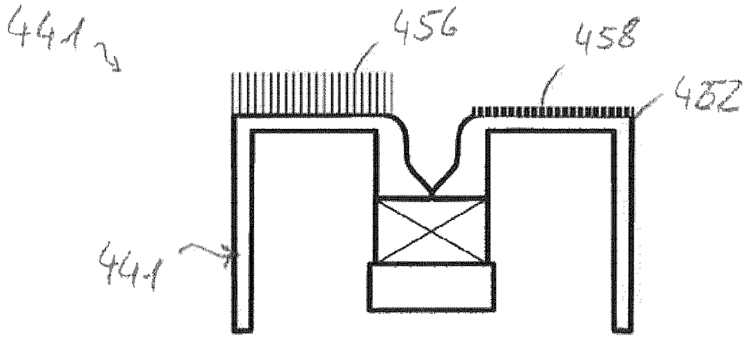
FIG. 19 shows the drive unit of FIG. 6 provided with structural cooling elements.

FIG. 19 shows the magnet unit 441 of FIG. 6, but provided with optional cooling features.

The magnet unit 441 is as described above with reference to FIG. 6. However, the exposed portion 444 is provided with structural cooling elements 456, 458 to increase the surface area of the exposed portion 444. In this example, the structural cooling elements 456, 458 are provided as cooling fins 456 and as cooling channels 458.

In view of the exemplary drive units 400, 600, 900, the person skilled in the art can easily imagine further examples where the magnetic flux is split into dominant portions by means of one or several washers (split-washer design) or gaps or dominant winding portions introduced in the voice coil winding (split-winding) to shape the resulting BL (x) curve trading off linearity vs force factor at rest position.

Figure 20:
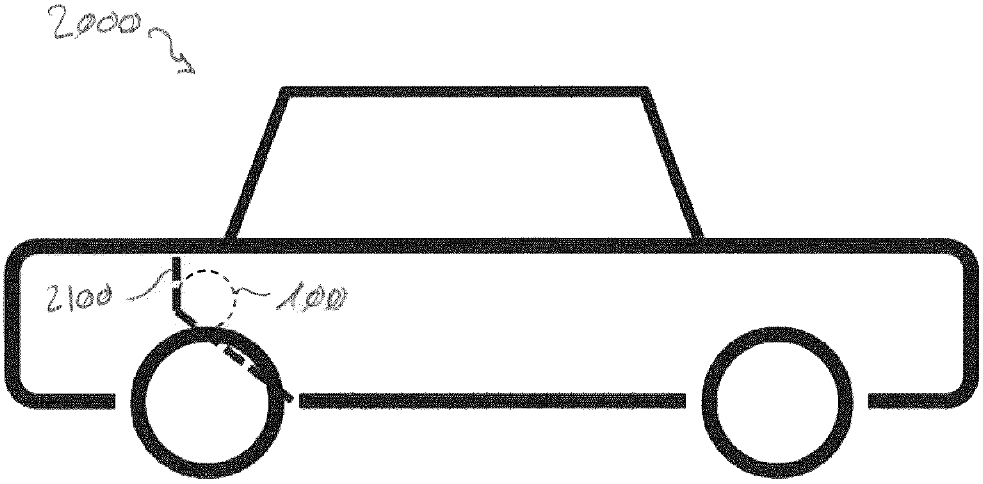
FIG. 20 is a sideview of an automobile with a loudspeaker.

FIG. 20 shows an automobile 2000. Any exemplary loudspeaker as described above may be installed in the automobile 2000. In this example, the loudspeaker 100 described above with reference to FIG. 4 is provided between the footwells 2100 of the automobile 2000. Other locations are also envisaged, such as at or towards the bottom of an A-style.

The exemplary loudspeakers described above may be manufacturable using existing tooling. The exemplary loudspeakers make use of traditional loudspeaker components built into a single frame, allowing production on existing production lines with existing machines, jigs and fixtures.

Each loudspeaker can be easily built independently with a single jig inserted at the bottom of the frame, first aligning the magnet unit parts towards each other and with respect to the frame. Adding the damper and cone assembly is simple and just like traditional loudspeaker building. In fact, having the cone connected to the magnet unit does not require a dustcap anymore and the coil working without flexible leadwires may make the build easier than that of a traditional loudspeaker.

The voice coil of the drive unit is made from square wire, i.e. wire with a square cross-section. As the use of rectangular wire does not shift down the centre of gravity of the moving assembly (as the coil is fixed to the frame anyway) it is a convenient way of increasing the motor strength without any downsides except cost. Also, the filling factor for a winding from square wire is substantially higher than that of a traditional helical winding using round wire. With ever increasing Neodymium raw material prices such “exotic” coils are becoming more and more viable as an alternative when trading off cost between components for same performance.

The voice coil of the drive unit may be made from any suitable material. In this example, the wire from which the voice coil is formed is made out of copper. Suitable metals or metal alloys, such as aluminium, are also envisaged.

The diaphragm is formed from aluminium, which is a thermal conductor with high thermal conductivity.

The diaphragm, i.e. cone, is made from 0.4 mm thick aluminium and so effectively acts as heat sink giving the loudspeaker excellent power handling capability.

The translatable part of the drive unit includes a thermal conductor with high thermal conductivity (e.g. of at least 40 Watts/(metres*Kelvin)), heat generated as a result of operation may be removed more efficiently from the loudspeaker. Suitably, the washer and the yoke are made of steel, although other materials are possible. As steel parts are guiding the flux lines away from the magnet the height of the magnet is independent from the motor system linearity unlike in an open magnet system (cf. FIG. 3; requires a high magnet in order to avoid flux line cancellation in voice coil). This allows for the usage of a small volume of high-grade Neodymium, e.g. N55 which typically yields the lowest cost.

Some or all of the following aspects may be present in the examples described above:

- A magnet unit with at least one permanent magnet and at least two flux guiding elements.
- The magnet unit suspended in the frame free to oscillate axially.
- A diaphragm connected to the magnet unit, directly or via an intermediate member, intended for sound radiation in air.
- At least one voice coil winding fixed to the frame, directly or via an intermediate member such as a voice coil former.
- The voice coil winding being 50% thicker than the outside portion of the yoke.
- The voice coil winding being 50% heavier than the permanent magnet.
- The centre of gravity of the magnet unit being between the landing surfaces, effectively pushing rocking modes outside the working frequency range of the loudspeaker.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word “comprise” and “include”, and variations such as “comprises”, “comprising”, and “including” will be understood to imply the inclusion of a stated integer or step or group of integers or steps but not the exclusion of any other integer or step or group of integers or steps.

It must be noted that, as used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by the use of the antecedent “about,” it will be understood that the particular value forms another embodiment. The term “about” in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

The invention claimed is:

1. A loudspeaker including:

a frame, a diaphragm suspended from the frame and a drive unit;

wherein the drive unit has a stationary part secured to the frame and a translatable part secured to the diaphragm;

wherein the translatable part of the drive unit includes a magnet unit which includes at least one permanent magnet, a washer and a yoke, wherein the magnet unit is configured to produce a magnetic field in an air gap between the washer and a sidewall of the yoke, wherein the at least one permanent magnet, the washer and the yoke are configured to guide magnetic flux provided by the at least one permanent magnet to the air gap;

wherein the stationary part of the drive unit includes a voice coil configured to sit in the air gap when the diaphragm is at rest;

wherein the at least one permanent magnet has a first mass, the voice coil has a second mass, and the first mass is smaller than the second mass;

wherein the loudspeaker is operable to energise the voice coil to cause the magnet unit to move along a movement axis relative to the voice coil, thereby moving the diaphragm along the movement axis to produce sound;

further including a first suspension element attached to the frame at a first landing surface on the frame and a second suspension element attached to the frame at a second landing surface on the frame, wherein the centre of gravity of the translatable part of the drive unit has a position along the movement axis that is between the first landing surface and the second landing surface;

wherein the loudspeaker is provided as a subwoofer configured to produce sound with frequencies in a bass frequency range.

2. The loudspeaker according to claim 1, wherein the first suspension element is secured to an outer edge of the diaphragm, and wherein the second suspension element is secured to the translatable part of the drive unit.

3. The loudspeaker according to claim 1, wherein:

the diaphragm has a first radiating surface facing in a forward direction and a second radiating surface facing in a rearward direction;

the yoke is a U-yoke;

the U-yoke of the translatable part of the drive unit is located in an aperture through the diaphragm; and an exposed portion of the U-yoke of the translatable part of the drive unit faces in the forward direction and an inner portion of the U-yoke of the translatable part faces in the rearward direction.

4. The loudspeaker according to claim 3, wherein the exposed portion of the U-yoke of the translatable part includes structural cooling elements for dissipation of heat to ambient air.

5. The loudspeaker according to claim 4, wherein the structural cooling elements include cooling fins or cooling channels.

6. The loudspeaker according to claim 1, wherein a wire from which the voice coil is formed has a rectangular cross-section.

7. The loudspeaker according to claim 1, wherein the first mass is smaller than the second mass by at least a factor of two.

8. The loudspeaker according to claim 1, wherein the yoke includes a base and the sidewall extends from the base, wherein a thickness of the voice coil in a direction perpendicular to the movement axis is greater than a thickness of the sidewall of the yoke in the direction perpendicular to the movement axis, wherein the air gap is formed between the washer and the yoke, and wherein the yoke is a U-yoke.

9. The loudspeaker according to claim 8, wherein the thickness of the voice coil is greater than the thickness of the sidewall by at least a factor of three.

10. A loudspeaker assembly including a first loudspeaker according to claim 1 and a second loudspeaker according to claim 1, wherein the first loudspeaker and the second loudspeaker are arranged in back-to-back configuration such that the first loudspeaker and the second loudspeaker face in opposite directions;

wherein the loudspeaker assembly is operable to energise the voice coil of the first loudspeaker and the voice coil of the second loudspeaker to cause the magnet unit of the first loudspeaker and the magnet unit of the second loudspeaker to move along the movement axis in opposite directions, thereby moving the diaphragm of the first loudspeaker and the diaphragm of the second loudspeaker to produce sound.

11. The loudspeaker assembly according to claim 10, including a magnetic shielding member provided between the first loudspeaker and the second loudspeaker to magnetically shield the magnet units of the first loudspeaker and the second loudspeaker from one another.

12. The loudspeaker assembly according to claim 11, wherein the magnetic shielding member is configured to become saturated with magnetic flux when the magnet unit of the first loudspeaker and the magnet unit of the second loudspeaker approach the magnetic shielding member, thereby causing mutual repulsion of the magnet units.

* * * * *